C. G. MORTIMER.

CAN-OPENER.

No. 185,947. Patented Jan. 2, 1877.

WITNESSES
H. Aubrey Toulmin
H. N. Miller

INVENTOR
Chas. G. Mortimer
Alexander & Mason
ATTORNEYS.

N. PETERS, PHOTO-LITHOGRAPHER, WASHINGTON, D. C.

UNITED STATES PATENT OFFICE.

CHARLES G. MORTIMER, OF NEW YORK, N. Y., ASSIGNOR OF ONE-HALF HIS RIGHT TO JUSTUS W. MEYER, OF SAME PLACE.

IMPROVEMENT IN CAN-OPENERS.

Specification forming part of Letters Patent No. 185,947, dated January 2, 1877; application filed November 14, 1876.

*To all whom it may concern:*

Be it known that I, CHAS. G. MORTIMER, of New York city, in the county of New York, and in the State of New York, have invented certain new and useful Improvements in Can-Opener; and do hereby declare that the following is a full, clear, and exact description thereof, reference being had to the accompanying drawing, and to the letters of reference marked thereon, making a part of this specification.

The nature of my invention relates to a can-opener capable of cutting either round or straight sided cans; and it consists in combining with a suitable handle a stirrup having removable cutter and eccentric lever; also, in combining with this handle a removable point and a removable and adjustable angular cutter, all as hereinafter more fully set forth and definitely claimed.

In order to enable others skilled in the art to which my invention appertains to make and use the same, I will now proceed to describe its construction and operation, referring to the annexed drawing, in which—

Figure 1:
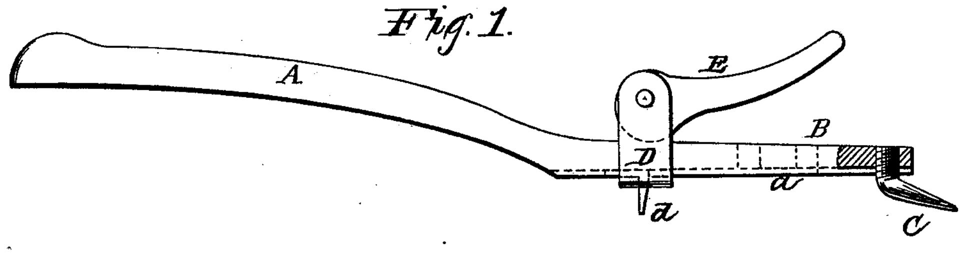
Figure 2:
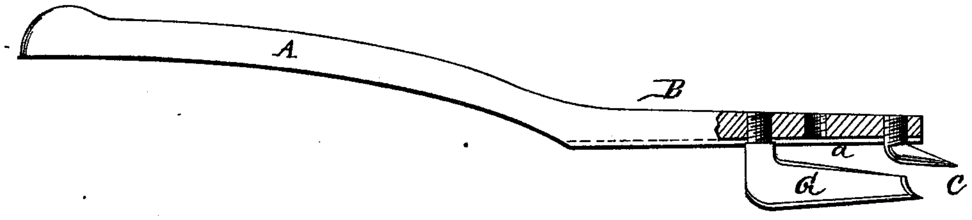

Figure 1 is a side view, part in section, of my can-opener, arranged for opening circular cans. Fig. 2 is a similar view, showing it arranged for other cans.

A represents the handle of my can-opener, of any suitable form, the end of which constitutes a shank, B, which is made straight and has a longitudinal groove on its under side, leaving flanges *a a* along the side edges, as shown. In the outer end of the shank B, from the under side, is screwed an L-shaped point, C, which projects beyond the end of the shank. D represents a stirrup, having an eccentric lever, E, pivoted between its ends. In the center of the stirrup D is a slot for the passage of an L-shaped cutter or knife, *d*. When this knife has been placed in the stirrup the shank B is passed through said stirrup, which is then held at any point desired on the shank by means of the eccentric lever E. The point C is then screwed in its place, where it belongs in the end of the shank. In opening round cans the point C is driven into the center of the top, and then by bearing down upon the handle and turning the same around the point as on a center the knife *d* will cut out the piece. For straight-sided cans the stirrup and its attachments are removed, and a knife, G, screwed into the shank B, as shown in Fig. 2. The point C in this case simply acts as a fulcrum for forcing the knife through the metal.

The various parts being all removable from the shank they can easily be removed and replaced when needed.

Having thus fully described my invention, what I claim as new, and desire to secure by Letters Patent, is—

1. The combination of the stirrup D, removable cutter *d*, and eccentric lever E, with the handle A B, substantially as and for the purposes herein set forth.

2. The combination, with the handle A B, having screw-openings *a* for receiving the removable and adjustable angular cutter G, of the removable point C, substantially as and for the purposes herein set forth.

In testimony that I claim the foregoing I have hereunto set my hand.

CHARLES G. MORTIMER.

Witnesses:

G. W. THOMPSON,

GEO. W. MOORE.